Oct. 8, 1968
B. W. SORENSON ET AL
3,404,884
BALANCE BEAM ADAPTER FOR GYMNASTIC APPARATUS TRANSPORTERS
Filed Sept. 27, 1965
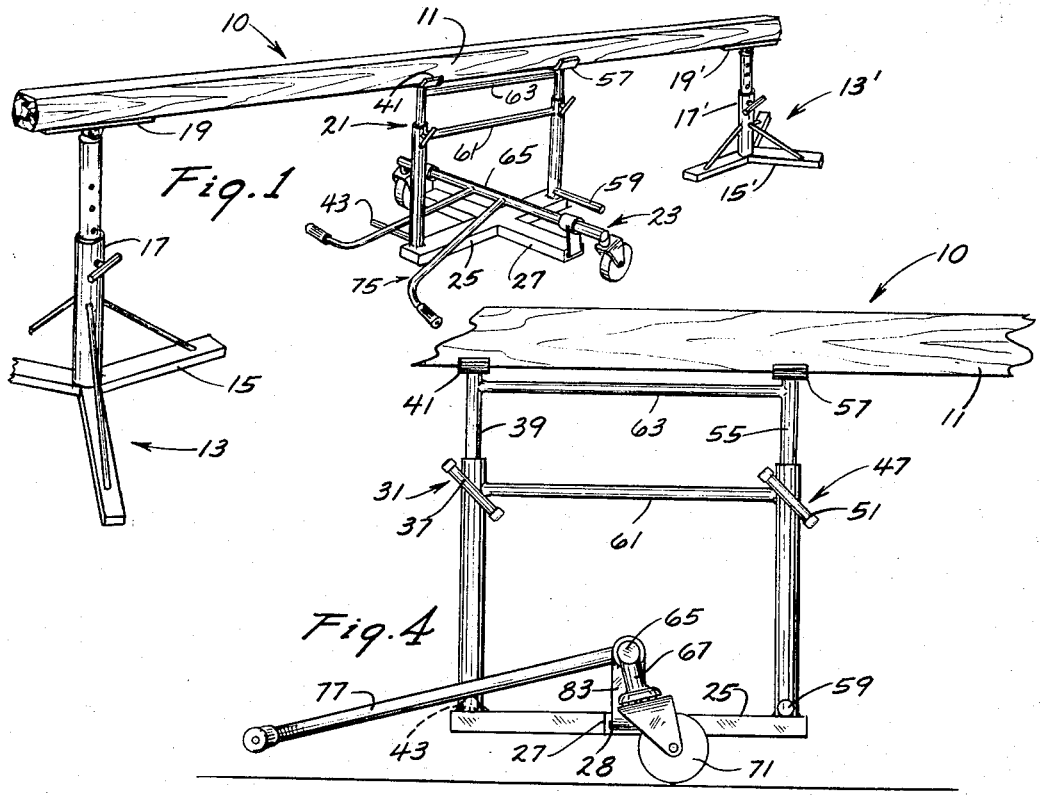
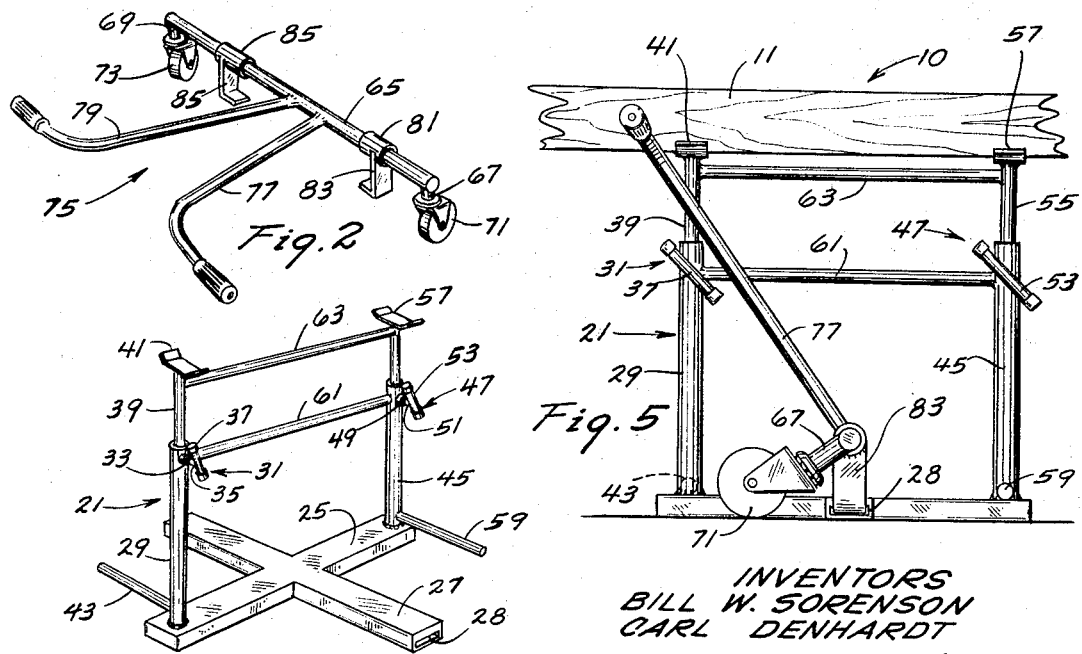
INVENTORS
BILL W. SORENSON
CARL DENHARDT
BY Zock, Zarley, McKee & Thomte
ATTORNEYS

United States Patent Office 3,404,884
Patented Oct. 8, 1968

3,404,884
BALANCE BEAM ADAPTER FOR GYMNASTIC APPARATUS TRANSPORTERS
Bill W. Sorenson and Carl Denhardt, Jefferson, Iowa, assignors, by mesne assignments, to New American Co., Inc., Jefferson, Iowa, a corporation of Iowa
Filed Sept. 27, 1965, Ser. No. 490,574
12 Claims. (Cl. 272—60)

ABSTRACT OF THE DISCLOSURE

A balance beam adapter for gymnastic apparatus transporters, the adapter including a support means adapted to engage the balance beam. A base portion is secured to the lower end of the support means and is adapted to be detachably secured to and raised by a gymnastic apparatus transporter so that the balance beam may be lifted from its supporting surface to transport the same.

---

Balance beams are common gymnastic equipment and consist of a horizontal beam supported by end supports at opposite ends thereof. The end supports include a top plate pivotally movable in a vertical plane which is bolted to the balance beam. The pivotal connection between the end supports and the balance beam permits the end supports or legs to swing backward and forward under the beam and permits the beam to sit level. Because the beam is pivotally connected to the end supports, it is difficult to pick up the beam by the two end supports with an ordinary gymnastic transporter or modification thereof.

Therefore, it is a principal object of this invention to provide a balance beam adapter for gymnastic apparatus transporters.

A further object of this invention is to provide a balance beam adapter which may be used to lift balance beams positioned at various heights.

A further object of this invention is to provide a balance beam adapter for gymnastic apparatus transporters which permits the transporter to be used for other transporting tasks.

A further object of this invention is to provide a balance beam adapter for gymnastic apparatus transporters which permits the beam to be easily lifted from its supporting surface and moved thereabout.

A further object of this invention is to provide a balance beam adapter for gymnastic apparatus transporters having a means thereon to limit the pivotal movement of the transporter with respect to the adapter.

A further object of this invention is to provide a balance beam adapter for gymnastic apparatus transporters which is safe and convenient to use.

A further object of this invention is to provide a balance beam adapter for gymnastic apparatus transporters which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view illustrating the adapter and transporter supporting a balance beam;

FIG. 2 is a perspective view of the transporter;

FIG. 3 is a perspective view of the balance beam adapter;

FIG. 4 is a side view illustrating the relationship between the adapter and transporter when the transporter has raised the adapter and balance beam from the supporting surface; and FIG. 5 is a side view illustrating the relationship between the adapter and the transporter after the transporter has been detachably secured to the adapter but prior to the transporter raising the adapter from its supporting surface.

The numeral 10 generally designates a balance beam apparatus including a wooden horizontal beam 11 supported by vertically adjustable end supports 13 and 13' at opposite ends thereof. End supports 13 and 13' are identical and for that reason only end support 13 will be described with " ' " indicating identical structure on end support 13'. End support 13 includes a base portion 15, selectively adjustable telescoping means 17 and a plate 19 pivotally secured to the upper end of telescoping means 17. Plate 19 is secured to the underside of beam 11 by bolts or screws. The pivotal connection between plates 19 and 19' and beam 11 permits one end of the beam to be raised or lowered without adversely effecting the engagement between the end support and its supporting surface. The pivotal connection between plates 19 and 19' and beam 11 also permits the beam to sit level regardless of the contour of the supporting surface.

The numeral 21 generally designates the balance beam adapter of this invention while the numeral 23 designates the gymnastic apparatus transporter. Adapter 21 includes a longitudinal base member 25 and a transverse base member 27 extending at a right angle thereto and intersecting at the center of their lengths. As seen in FIGS. 3, 4 and 5, one end of the base member 27 is provided with a rectangular bore 28 extending thereinto. The other end of base member 27 is also provided with a rectangular bore extending thereinto (not shown) which is identical to bore 28. Secured to one end of base member 25 by welding or the like is an upstanding pipe member 29 having a spin lock assembly 31 operatively mounted on its upper end. Spin lock assembly 31 includes a nut 33 welded to pipe 29 which registers with an opening therein (not shown) and a threaded bolt member 35 threadably extending therethrough. Bolt 35 is provided with a handle portion 37 at its outer end.

A pipe member 39 is telescopically received by pipe member 29 and has an arcuate bracket 41 secured to its upper end by welding or the like. An elongated stop means 43 is welded to pipe member 29 adjacent the lower end thereof (FIG. 3) and extends transversely thereto and is parallel with transverse base member 29.

Secured to the other end of base member 25 by welding or the like is an upstanding pipe member 45 having a spin lock assembly 47 operatively mounted on its upper end. Spin lock assembly 47 includes a nut 49 welded to pipe 45 which registers with an opening therein (not shown) and a threaded bolt member 51 threadably extending therethrough. Bolt 51 is provided with a handle portion 53 at its outer end.

A pipe member 55 is telescopically received by pipe member 45 and has an arcuate bracket 57 secured to its upper end by welding or the like. An elongated stop means 59 is welded to pipe 45 adjacent the lower end thereof and extends transversely thereto and is parallel with transverse base member 27. It can be seen from FIG. 3 that stop means 43 and stop means 59 extend in opposite directions.

A cross brace 61 is welded to pipe members 29 and 45 adjacent the upper ends thereof and extends therebetween as seen in the drawings. A cross brace 63 is welded to pipe members 39 and 55 adjacent the upper ends thereof and extends therebetween as seen in the drawings.

Transporter 23 includes an elongated axle 65 having caster wheel support arms 67 and 69 secured to its opposite ends by welding or the like which extend transversely to axle 65. Caster wheel assemblies 71 and 73 are operatively secured to the outer ends of caster wheel support arms 67 and 69 respectively.

A handle means 75 including handle members 77 and 79 is welded to axle 65 as best seen in FIG. 2. As best seen in FIG. 4 and 5, the angle between the longitudinal axis of handle member 77 and the longitudinal axis of caster wheel support arm 67 is slightly more than 90 degrees to permit increased leverage as will be explained later. The same is true with respect to handle member 79 and caster wheel support arm 69 inasmuch as caster wheel support arms 67 and 69 are in the same plane and handle members 77 and 79 are in the same plane.

A collar 81 is slidably mounted on axle 65 between handle member 77 and support arm 67 and has a hook member 83 welded thereto which extends downwardly and then inwardly as seen in FIG. 2. A collar 85 slidably embraces axle 65 at a point between handle member 79 and support arm 69 and has a hook member 87 welded thereto which extends downwardly therefrom and then inwardly as seen in FIG. 2.

The normal method of operation is as follows. Balance beam 10 will normally be positioned as seen in FIG. 1. When the balance beam is being used, adapter 21 and transporter 23 will not be positioned as seen in the drawings.

When it is desired to move the balance beam from one location to another, the adapter 21 is positioned below beam 11 at the center of the length thereof. Spin latch assemblies 31 and 47 are loosened and pipe members 39 and 55 are slidably moved upwardly until brackets 41 and 57 engage the underside of beam 11 and spin latch assemblies 31 and 47 again retightened. The inner ends of bolt members 35 and 51 engage the exterior surfaces of pipe members 39 and 55 to prevent movement between pipe members 39, 55, and pipe members 29, 45, respectively. Adapter 21 can be adjusted to engage the underside of beam 11 regardless of the height of beam 11. With adapter 21 positioned as described above, transporter 23 is positioned so that axle 65 is between pipe members 29 and 45 as seen in FIG. 5. Collar 81 is then slidably moved on axle 65 so that the inwardly extending portion of hook 83 is received by bore 28 in transverse base member 27. Collar 85 is also slidably moved on axle 65 and the inwardly extending portion of hook 85 is slidably received by the bore formed in the other end of transverse base member 28. Adapter 21 and balance beam 10 are then raised by simply exerting downward pressure on handle means 75. The downward movement of handle means 75 causes axle 65 to be rotated with respect to hooks 83 and 85. The rotation of axle 65 causes caster wheel assemblies 71 and 73 to be moved from the position of FIG. 5 to the position of FIG. 4 thereby causing adapter 21 to be vertically raised which in turn causes balance beam 10 to be raised from its supporting surface. The downward movement of handle means 75 is limited due to the engagement of handle member 79 with stop means 43. Stop means 43 prevents handle means 75 from engaging the floor. The weight of balance beam 10 will cause transporter 23 to remain in the position seen in FIG. 4 until handle means 75 is manually raised upwardly. Because the angle between member 77 and support arm 67 is slightly more than 90 degrees, increased leverage is exerted on caster wheel assembly 71 and handle member 77. It can be appreciated that if the angle between handle member 77 and support arm 67 were less than 90 degrees, transporter 23 could be easily inadvertently disengaged from the position of FIG. 4 to the position of FIG. 5. When balance beam 10 has been raised to the position seen in FIG. 4, it is simply necessary to grasp balance beam 10 and push or pull it to the desired location. Caster wheel assemblies 71 and 73 insure that the device may be easily maeuvered. When the balance beam 10 has been moved to the desired location, it is simply necessary to move handle means 75 upwardly so that the transporter 23 moves from the position of FIG. 4 to the position of FIG. 5. Pipe members 39 and 55 are then lowered by means of spin lock assemblies 31 and 47 to facilitate the removal of adapter 21 from the underside of beam 11. If desired, adapter 21 and transporter 23 may be removed as a unit or may be removed separately. It can be appreciated that transporter 23 may be mounted on adapter 21 so that handle members 77 and 79 are positioned adjacent pipe member 29 or positioned adjacent pipe member 45 due to the provision of stop means 59 on pipe member 45.

Thus it can be seen that an adapter has been provided which permits conventional gymnastic apparatus transporters to move balance beams which heretofore was not possible. The transporters can be used for the transportation of other gymnastic equipment.

Thus it can be seen that the device accomplishes at least all of its stated objectives.

Some changes may be made in the construction and arrangement of our balance beam adapter for gymnastic apparatus transporters without departing from the real spirit and purpose of our intention, and it is our intention to cover by our claims, any modified forms of structure or use of mechanical equivalents which may be reasonably included within their scope.

We claim:

1. In combination with an elongated, substantially horizontal balance beam,
a balance beam adapter including an elongated longitudinal base member, and elongated transverse base member extending at a right angle thereto and having opposite ends, said opposite ends of said transverse base member being on opposite sides of said longitudinal base member; said opposite ends of said transverse base member each having a horizontal bore formed therein and extending thereinto; first and second pipe members secured to opposite ends of said longitudinal base member and extending upwardly therefrom, third and fourth pipe members selectively slidably received by said first and second pipe members respectively and each having a bracket secured to its upper end adapted to engage the underside of said beam at times; means for selectively locking said third and fourth pipe members in various positions of their slidable movement with said first and second pipe members;
and a transporter means including means thereon adapted to be received by said horizontal bores; said transporter means adapted to raise said means received by said horizontal bores whereby said adapter will be raised thereby causing said beam to be raised from its supporting surface for transportation of said beam.

2. The combination of claim 1 wherein said transporter means includes an axle having elongated wheel support arms at opposite ends thereof extending transversely thereto and has an elongated handle means secured to said axle; the angle between the longitudinal axis of said handle means and the longitudinal axes of said support arms being greater than 90 degrees.

3. In combination with an elongated, substantially horizontal balance beam,
a balance beam adapter including an elongated longitudinal base member, an elongated transverse base member extending at a right angle thereto and having opposite ends, said opposite ends of said transverse base member being on opposite sides of said longitudinal base member; said opposite ends of said transverse base member each having a horizontal bore formed therein and extending thereinto; first and second pipe members secured to opposite ends of said longitudinal base member and extending upwardly therefrom, third and fourth pipe members selectively slidably received by said first and second pipe members respectively and each having a bracket secured to its upper end adapted to engage the underside of said beam at times; means for selectively locking said third and fourth pipe members in various positions of their slidable movement with said first and second pipe members;

said horizontal bores being adapted to receive hook means extending from a transporting means to facilitate the raising and lowering of said adapter and said beam.

4. In combination,
a gymnastic transport means and a balancing beam adapter,
said transport means including a wheel-supported horizontal support means,
support elements movably mounted on said support means,
said balance beam adapter detachably secured to said support elements,
said balance beam adapter including bracket means adapted to engage and support the horizontal portion of a gymnastic balance beam,
and means on said balance beam adapter for selectively raising or lowering said bracket means to a predetermined height.

5. The combination of claim 4 wherein said transport means includes means for selectively raising or lowering said horizontal support means.

6. The combination of claim 4 wherein said support elements are hook devices that are adapted to be slidably moved horizontally on said support means to be engaged or disengaged from a bearing surface on said balance beam adapter.

7. The combination of claim 6 wherein said balance beam adapter includes a transverse base member under said horizontal support means detachably secured to said hook devices, said transverse base member being bisected by a longitudinal base member, and said bracket means are secured to the ends of said longitudinal base member.

8. In combination,
an adapter for a balance beam, said adapter including a base portion, a vertically adjustable support means secured to and extending upwardly
from said base portion, the upper end of said support means
adapted to engage and support said balance beam at times,
a gymnastic transporter adapted to be detachably secured to said base
portion and adapted to raise said base portion from its supporting
surface to raise said support means thereby raising said balance
beam from its supporting surface,
said base portion including longitudinal base member and a transverse base member; said transporter including hook members slidably movable on an axle; said transverse base member having opposite ends having openings formed therein respectively which are adapted to detachably receive said hook members on said transporter.

9. In combination,
an adapter for a balance beam, said adapter including a base portion, a vertically adjustable support means secured to and extending upwardly
from said base portion, the upper end of said support means
adapted to engage and support said balance beam at times,
a gymnastic transporter adapted to be detachably secured to said base
portion and adapted to raise said base portion from its supporting
surface to raise said support means thereby raising said balance
beam from its supporting surface,
said support means including vertically disposed first and second telescoping means on opposite ends of said longitudinal base member respectively, the upper ends of said first and second telescoping means being adapted to engage and support said beam at times.

10. The combination of claim 9 wherein a cross brace is secured to and extends between said first and second telescoping means adjacent their upper ends.

11. The combination of claim 8 wherein said openings in said opposite ends of said transverse base member are adapted to detachably receive said hook member and are adapted to prevent rotational movement of said hook members with respect to said base portion.

12. The combination of claim 9 wherein a stop means is secured to at least one of said telescoping means to limit pivotal movement of said transporter with respect to said adapter at times.

References Cited

UNITED STATES PATENTS

| 438,640 | 10/1890 | Reach | 280—43.17 |
| 1,134,211 | 4/1915 | McCalmont | 254—8.4 |
| 2,597,765 | 5/1952 | Welburn | 248—129 |

FOREIGN PATENTS

| 740,911 | 11/1955 | Great Britain. |
| 819,535 | 9/1959 | Great Britain. |
| 870,085 | 6/1961 | Great Britain. |

ANTON O. OECHSLE, *Primary Examiner.*